Jan. 4, 1938.  W. T. MURDEN  2,104,136

RETARDING MECHANISM

Filed March 14, 1935

INVENTOR:
WILLIAM T. MURDEN,
BY
Gales P. Moore
HIS ATTORNEY.

Patented Jan. 4, 1938

2,104,136

UNITED STATES PATENT OFFICE 2,104,136

RETARDING MECHANISM

William T. Murden, Bristol, Conn., assignor to General Motors Corporation, Detroit, Mich., a corporation of Delaware Application March 14, 1935, Serial No. 11,121

11 Claims. (Cl. 192—6)

My invention relates to retarding mechanisms, and is particularly applicable to mechanisms of that character embodied in coaster brakes. My primary object is to insure proper movability between the elements that effect the retardation. To this end, and also to improve generally upon devices of the character indicated, my invention consists in the various matters hereinafter described and claimed.

Figure 1:
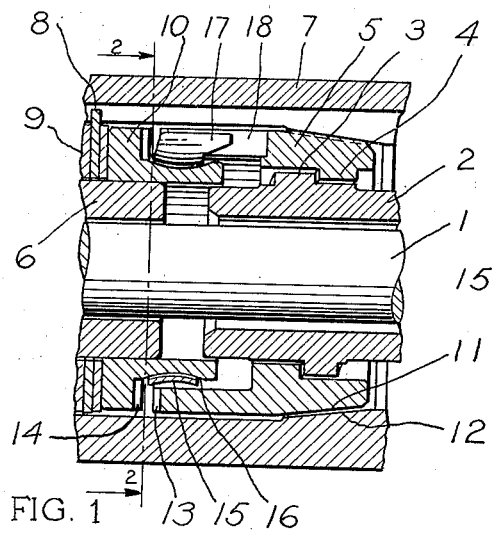
Figure 2:
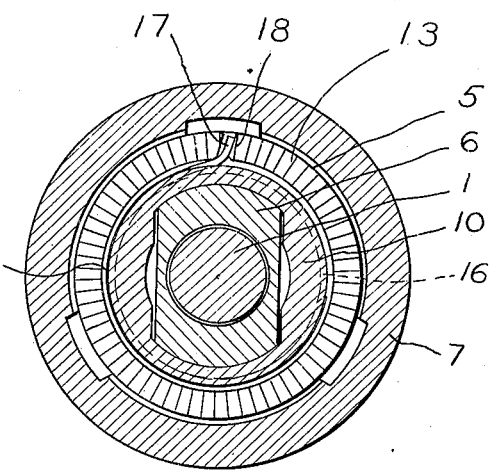
Figure 3:
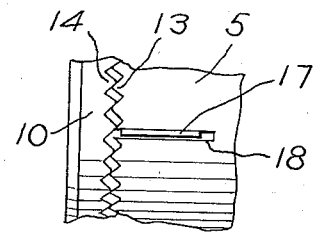
Figure 5:
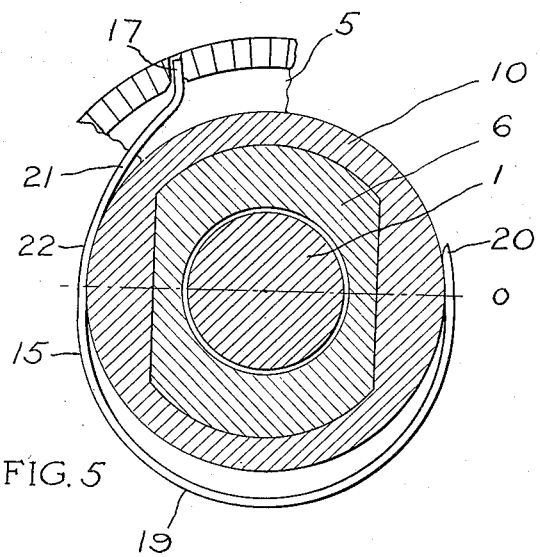
Figure 4:
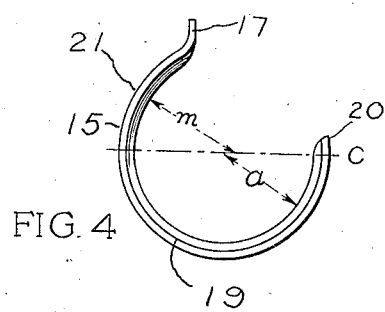

In the accompanying drawing, Figure 1 is a central, longitudinal sectional view of a portion of a coaster brake embodying my present invention; Figure 2 is a cross section on about the line 2—2 of Figure 1, looking in the direction of the arrows; Figure 3 is a fragmentary top plan view showing the parts in another position; Figure 4 is a side elevation of the retarder or lag-spring; and Figure 5 is an enlarged, exaggerated, diagrammatic view.

The general structure of coaster brake here illustrated is well known. It comprises a stationary axle 1 about which is rotatably supported a driver 2 which is ordinarily rigidly connected to a bicycle's usual sprocket wheel (not shown) and has coarse threads 3 intermeshing with mating threads 4 upon the nut-like, laterally-shiftable connector 5, about which and the stationary anchoring-sleeve 6 is rotatably supported the bicycle hub 7. The hub carries laterally-slidable brake-discs 8 that alternate with corresponding slidable but anchoring brake-discs 9 upon the anchoring-sleeve 6, and the brake becomes effective when the brake-actuator 10, that is slidably but non-rotatably mounted upon the anchoring-sleeve 6, is forced to the left, as the parts are shown in Figure 1, to squeeze the brake-discs 8 and 9 together. As is well known, forward rotation of the threaded driver 2 (by the usual bicycle sprocket wheel, and counter-clockwise as the parts are shown in Figure 2) causes that driver's threads to turn within the threaded connector 5 (assuming that that connector is at that time restrained against immediate rotation with the driver) and, consequently, to move that connector to the right as the parts are shown in Figure 1 until the connector's tapering clutch-end 11 becomes firmly seated in the hub's socket 12, whereupon continued forward turning of the driver 2 causes the hub to be driven with it. Should the driver 2 be held stationary (as by merely resting the feet on the bicycle pedals) momentum causes the hub 7 to continue its forward rotation, during the first of which the hub, by reason of its connection with the connector 5 at 11 and 12, causes the connector to rotate forwardly with it and thus, by reason of the threads 3 and 4, move to the left as the parts are shown in Figure 1 until the connection between hub and connector is broken. And upon backward rotation of the driver 2, if the connector 5 be restrained from similar rotation, the threads 3 and 4 cause the connector to be forced to the left as the parts are shown in Figure 1 and to thus push the brake-actuator 10 against the set of brake-discs 8 and 9 and squeeze those discs into braking relationship with each other. The face of the brake end of the connector 5 and the confronting face of the body portion of the brake-actuator 10 are provided with teeth, 13 and 14, of triangular cross-section, as indicated by Figure 3, and these teeth intermesh during the braking action and thus insure against relative turning of the connector at that time.

To insure the desired restraint of the connector 5 against improper turning with the driver 2, it is customary to provide a contractile, ring-like spring retarder or lag-device, as 15, that is received in a peripheral slot or groove 16 in the brake-actuator 10, that lag-spring frictionally engaging such brake-actuator and having a lug or finger 17 slidably received in a longitudinal slot or kerf 18 in the brake end of the connector, and such lag-spring engages the brake-actuator sufficiently tightly to prevent rotation of the connector 5 at those times at which rotation of the connector is undesired, and yet is rotatable forwardly about the brake-actuator when the connector is drivingly rotating the hub and the bicycle. Prior to my invention such lag-springs (except their finger portion 17) have, in edge view (of the character of Figure 4), had the form of the curve of a circle.

At times the finger portion 17 of those springs has become broken during operation of the mechanism, and I have discovered that such breakage has been caused by the fact that the portion of the circularly shaped springs at the base of the bent, upturned finger portion 17 closely hugs the restraining, anchored brake-actuator 10 and, by reason of such bend, is subject to stress concentration. The angular position which the connector assumes after driving or coasting is entirely a matter of chance, and it frequently happens that in such position the teeth 13 and 14 are not squarely in line for complete, fully-seated intermeshing but, on the contrary and as indicated in Figure 3, are so related that the sharp edges of the laterally-moving teeth 13 first engage the sharp edges or the inclined side faces of the brake-actuator's teeth 14, with the result that as the connector continues to shift laterally (to effect braking) the consequent lateral movement of the inclined tooth-faces against each other causes the connector to move angularly, or tend to so move, in a clockwise direction as the parts are shown in Figure 2. But any such angular movement of the connector requires that the lag-spring correspondingly move angularly with it, about the non-rotatable brake-actuator upon which that spring is supported, and the close engagement between such brake-actuator and the circular spring's bent portion at the base of its finger 17 together with the stress concentration at that point has created a resistance which has frequently proved too great to be overcome without breaking by the angular force exerted by the inclined faces of the teeth and the result has been that the strain thus put upon the upstanding finger portion has broken it. This tendency is accentuated because the annular space between the telescoping portions of the brake actuator 10 and the connector 5 where the spring is received is necessarily much restricted in a bicycle hub and the finger 17 and its support cannot be far removed from the brake-actuator.

In the illustrated embodiment of my invention what I here term the primary portion, 19, of my spring is formed upon the curve of the circle as heretofore, such primary portion of the free, unassembled spring extending throughout but little more than a semi-circle, that is to say, as shown in Figure 4 that portion 19 of the spring is upon the radius $a$ of such circle and comprises the semi-circle below the diameter $c$ plus the small portion that extends above that diameter to the spring's free end 20, while the remainder or what may be termed the secondary portion 21 of the spring's body portion is in the same plane and formed upon a longer radius $m$ centered upon the above-mentioned diameter $c$, although the portions 19 and 21 immediately join each other at that diameter. Thus, the spring's secondary portion 21 has a flatter curve than has the primary portion 19, and the result is that, although when the distended spring is placed about the circular brake-actuator 10 the spring's free end 20 and what may be termed an inner part, 22, of the secondary portion 21 engage the brake-actuator upon the same side of the latters' diameter $o$ and thus hold the spring on the brake-actuator, the remainder of the portion 21 smoothly and increasingly separates from the surface of the brake actuator (as indicated by Figure 5) as such portion proceeds toward the finger 17, so that the base of that finger is appreciably spaced from the brake-actuator's surface. Consequently, when the above-mentioned clockwise stress is given to the connector, instead of this stress being resisted by a finger-base closely hugging the brake actuator and jamming into it by reason of the stress concentrated at the relatively abrupt termination of the spring's body portion (where it joins the finger 17), the connector merely easily pulls the smoothly-extending portion 22 along the surface of the brake-actuator as the connector moves angularly, the portion of the spring that contacts with the periphery of the brake-actuator presenting no angles or other abrupt changes of direction for producing stress concentration. The secondary portion 21 has a radius which is only slightly larger than that of the brake actuator and since the concave side of the spring faces towards the brake actuator, the secondary portion very gradually recedes and forms a long finger support which is close to but clear of the brake actuator, thus providing maximum available clearance for flexure in a very restricted space. A spring successfully used with a brake-actuator whose diameter at the center of the groove 16 is seven hundred and seventy-five thousandths of an inch has its radius $a$ twenty-three sixty-fourths of an inch and its radius $m$ thirteen thirty-seconds of an inch.

Thus my present invention obviates detrimental straining and breaking of the finger, and affords an inexpensive and sturdy lag-spring of smooth and satisfactory operation and of increased life.

I claim as my invention:

1. In a device of the character indicated, the combination of a rotatable driver, a driven element, a non-rotatable braking element shiftable axially to effect braking of said driven element, means to prevent rotation of said braking element, a laterally-shiftable connector adapted in one lateral position to make driving connection with said driven element and in another lateral position to operate said braking element, there being relative rotation between said driver and said connector, means whereby such rotation effects said lateral shifting of said connector, and a retarder between said braking element and said connector and having an upstanding part in sliding engagement with said connector, said retarder being spaced from said braking element at the point of said connector-engaging part, slidingly engaging said brake element at a point removed from said connector-engaging part, and smoothly extending between said points; substantially as described.

2. In a device of the character indicated, the combination of a rotatable driver, a driven element, a non-rotatable braking element shiftable axially to effect braking of said driven element, means to prevent rotation of said braking element, a laterally-shiftable connector adapted in one lateral position to make driving connection with said driven element and in another lateral position to operate said braking element, there being relative rotation between said driver and said connector, means whereby such rotation effects said lateral shifting of said connector, and a lag-spring about said braking element and having at one end an upstanding finger slidably received in a slot in said connector, said retarder being spaced from said braking element at said finger-bearing end, slidingly engaging said braking element at a point removed from said end, and smoothly extending from said point of engagement to said end; substantially as described.

3. A retarder having a primary portion of one radius and a secondary portion immediately adjoining said primary portion and in the same plane of a greater radius but having its center of curvature upon a diameter of the circle defined by said first-mentioned radius, and a holder having a radius with a length between that of the other radii, the holder and the retarder being so assembled that the primary portion tends to grip the holder and the secondary portion tends to gradually depart therefrom; substantially as described.

4. A retarder comprising a primary portion greater than a semi-circle adapted to rotatably and frictionally engage a circular member of larger radius, a secondary portion immediately adjoining said primary portion and having a slightly greater radius than said primary portion but having its center of curvature upon a diameter of the circle which includes said primary portion, the secondary portion being in the same plane as the primary portion, and an upstanding part at that end of said secondary portion remote from said primary portion; substantially as described.

5. In a device of the character described, a holder of circular form, a member to be retarded with respect to the holder and having a part in close telescoping relation to the holder, and a retarding spring interposed between the member and the holder and having a primary portion frictionally pressing against the holder along an arc greater than a half circle, a secondary portion of the spring having a radius larger than that of the holder to gradually depart therefrom, and the concave side of the spring facing towards the holder; substantially as described.

6. In a device of the character described, a holder of circular form, a movable member rotatable with respect to the holder, the holder and the movable member having a restricted annular space therebetween, and a ring-like retarding spring engaging the holder in said restricted space and having an arcuate portion tensioned against the holder along an arc greater than a half circle, another portion of the spring gradually leaving the surface of the holder and having a terminal lug engaged with said movable member, and said other portion being curved on a slightly different radius from that of said arcuate portion and having its concave side faced towards the holder whereby the terminal lug is positioned close to the holder with a long supporting portion which is free from the holder; substantially as described.

7. In a coaster brake, a rotatable hub, a brake for the hub, a brake actuator held from rotation and adapted to be shifted axially in the hub, the brake actuator having tapering clutch teeth, a rotatable and axially shiftable connector having co-operating clutch teeth, means for causing the connector to shift axially to bring said teeth into clutching engagement and to axially shift the brake actuator to apply the brake, the connector and the brake actuator having telescoping extensions providing a restricted annular space therebetween, and a lag spring in said restricted space, said spring having an arcuate portion frictionally engaging one of said extensions and a terminal finger bent into a slot in the other extension, the spring having a portion connecting the finger to the friction portion, said connecting portion being curved on a slightly different radius than the friction portion to gradually depart from the adjacent extension and remove the finger therefrom whereby the bend of the finger is not forced against the adjacent extension when said engagement of the tapering teeth forces the connector to rotate; substantially as described.

8. In a coaster brake, a rotatable hub, a brake for the hub, a brake actuator held from rotation and adapted to be shifted axially in the hub, a rotatable and axially shiftable connector, means for causing the connector to shift axially against the brake actuator to axially shift the actuator and apply the brake, the brake actuator and the connector having telescoping extensions providing a restricted annular space therebetween, and a lag spring in said space to retard rotation of the connector, said spring having an arcuate portion frictionally engaging one of said extensions and a terminal finger bent into a slot in the other extension, the spring having a portion connecting the finger to the friction portion, said connecting portion being curved on a slightly different radius than the friction portion to gradually depart from the adjacent extension and remove the bend of the finger therefrom; substantially as described.

9. In a coaster brake, a rotatable hub, a brake for the hub, a brake actuator held from rotation and adapted to be shifted axially in the hub, a rotatable and axially shiftable connector, means for causing the connector to shift axially against the brake actuator to axially shift the actuator and apply the brake, and a lag spring reacting between the brake actuator and the connector, said spring having a portion wrapped around and frictionally engaging the brake actuator with a terminal finger bent into a slot of the connector, the spring having a portion connecting the finger to the friction portion, said connecting portion being curved on a slightly larger radius than the radius of the friction portion to gradually depart from the brake actuator through a substantial angular distance with a small amount of radial departure; substantially as described.

10. In a device of the character indicated, a holder, a rotatable member to be retarded with respect to the holder, a retarder having an arcuate primary portion rotatably and frictionally gripping the holder, the retarder having an arcuate secondary portion in the plane of the primary portion and having a terminal end interlocking with said rotatable member, said secondary portion having a radius slightly larger than that of the holder with its concave side facing the holder to provide the terminal end with a long support close to the holder but spaced therefrom; substantially as described.

11. In a device of the character indicated, a holder, a rotatable member having a portion in close telescoping relation to the holder and forming therewith a restricted annular space, a retarder in said space and having an arcuate primary portion rotatably and frictionally gripping the holder, the retarder having a secondary arcuate portion in the plane of the primary portion and having a terminal end interlocking with said rotatable member, said secondary portion having a curvature differing slightly from that of the holder to gradually and smoothly depart from the holder through a substantial angular distance whereby said terminal end has a long support which is in close proximity to the holder but spaced therefrom; substantially as described.

WILLIAM T. MURDEN.